Figure 1:
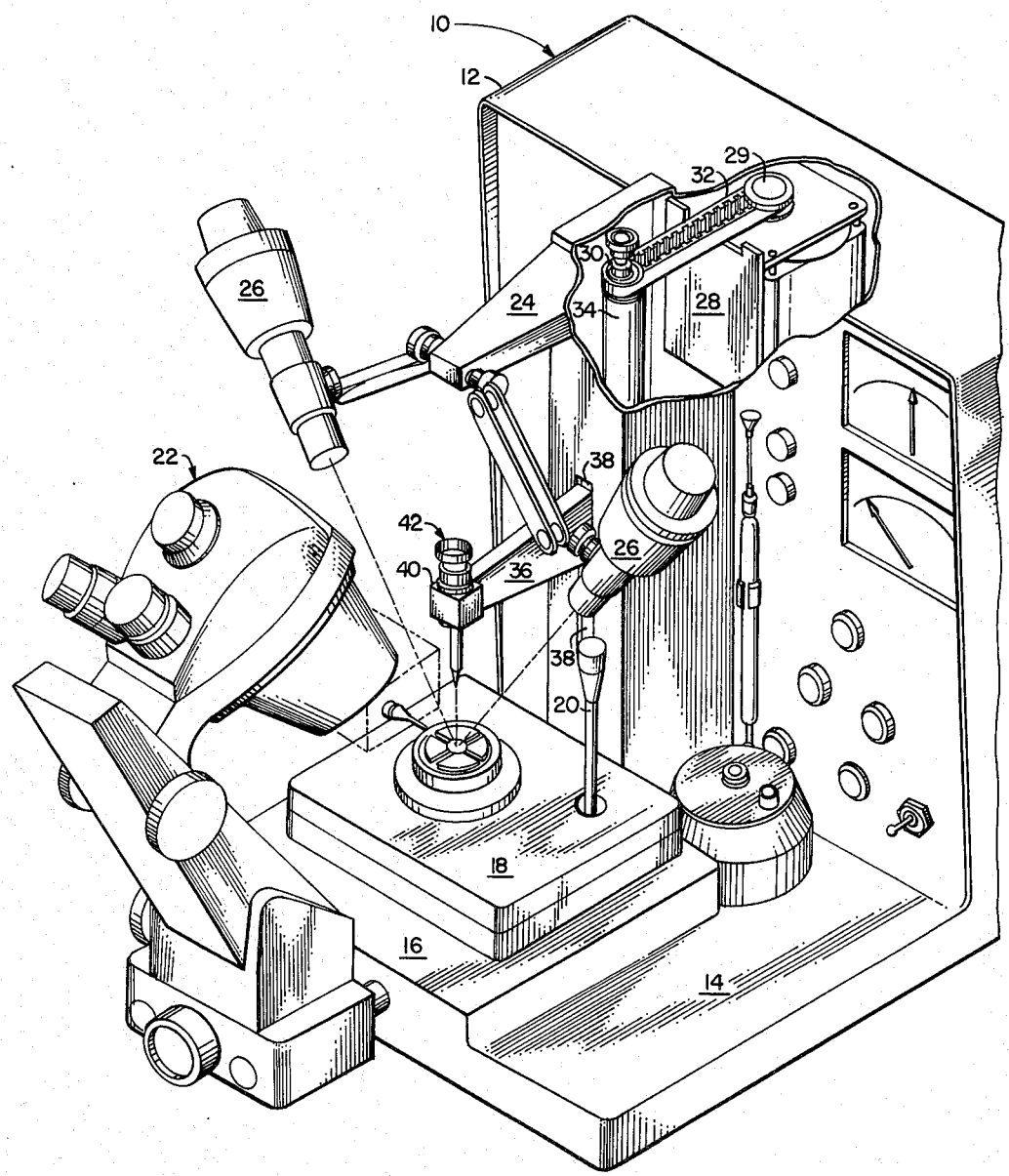

Feb. 8, 1966     M. PENBERG     3,234,354
PRECISION ELECTRIC MICROWELDER
Filed Aug. 1, 1962     5 Sheets-Sheet 1

INVENTOR.
MORTIMER PENBERG
BY
ATTORNEY

Feb. 8, 1966     M. PENBERG     3,234,354
PRECISION ELECTRIC MICROWELDER
Filed Aug. 1, 1962     5 Sheets-Sheet 2
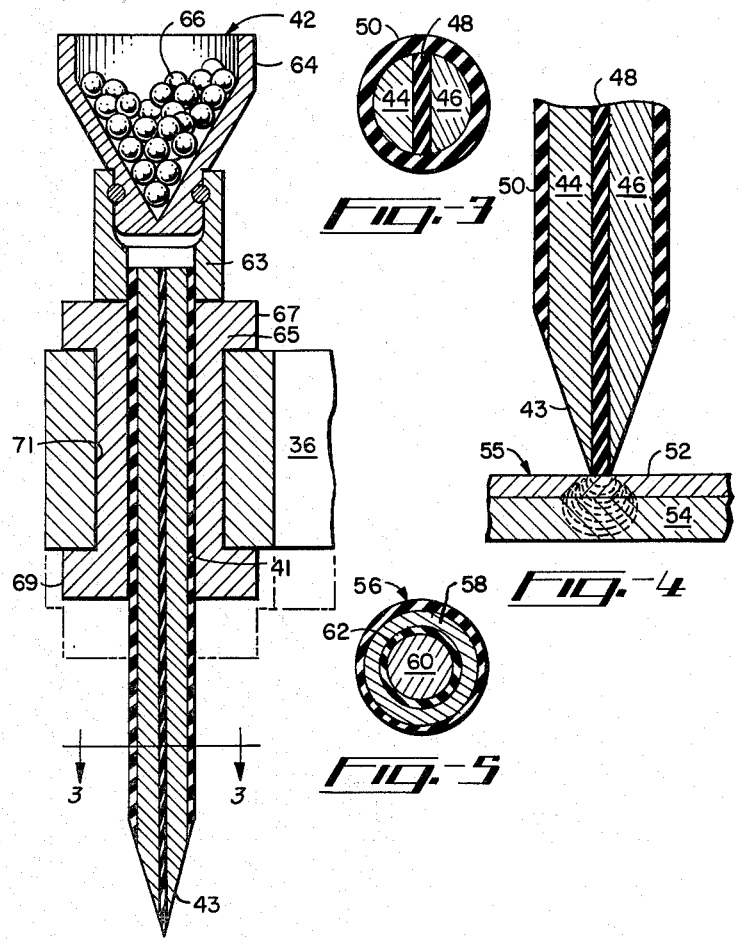
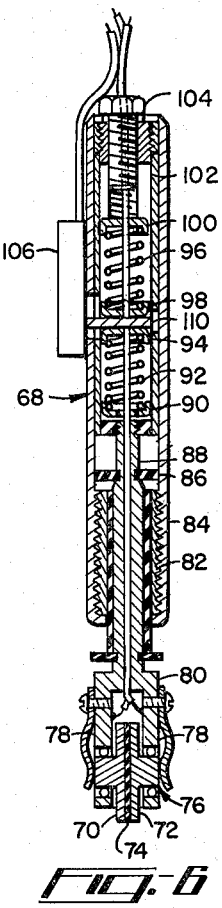
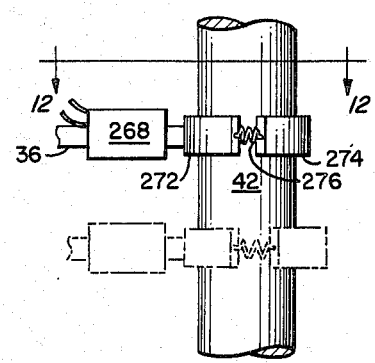
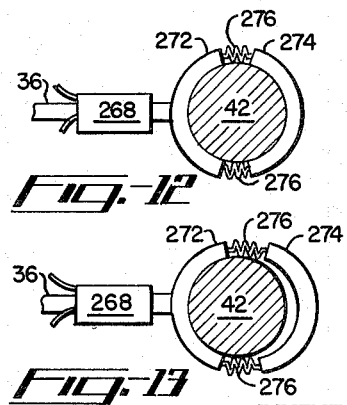
INVENTOR.
MORTIMER PENBERG
BY
ATTORNEY

INVENTOR.
MORTIMER PENBERG

ATTORNEY

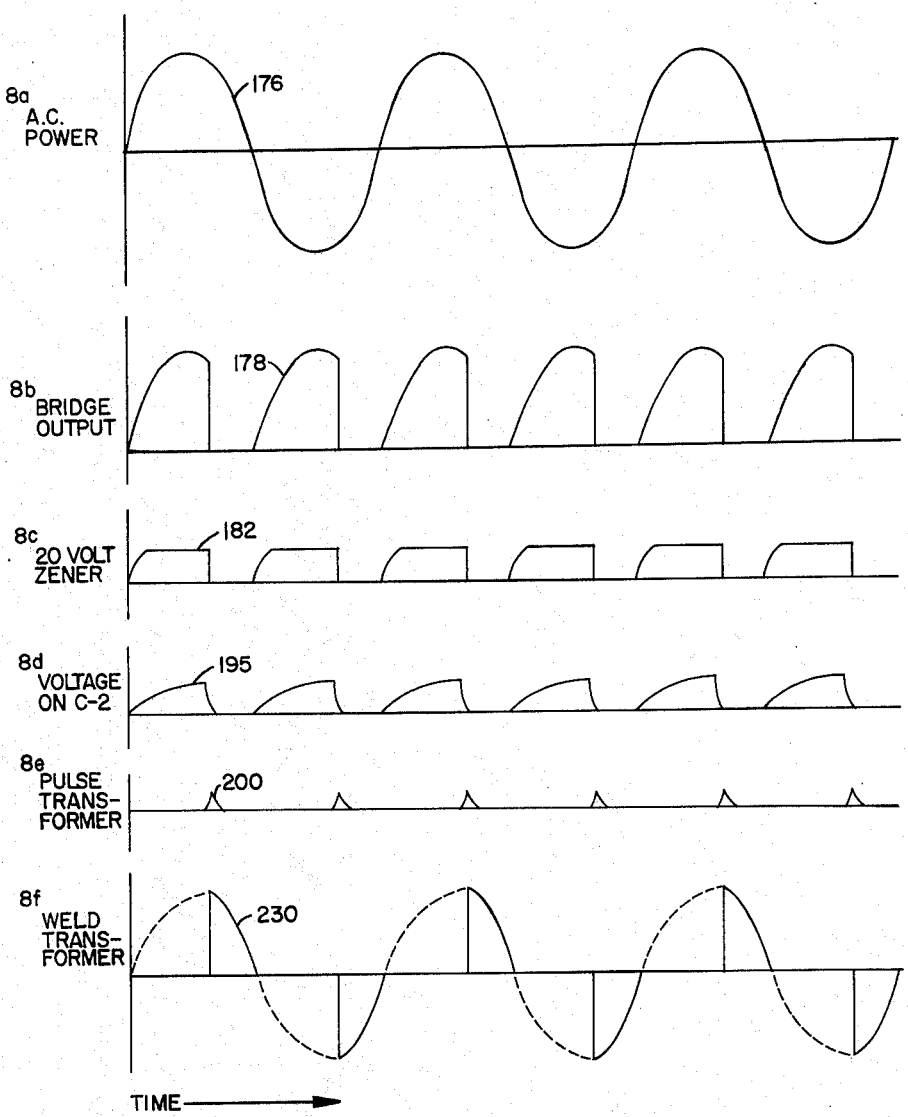

INVENTOR.
MORTIMER PENBERG
BY
ATTORNEY

United States Patent Office 3,234,354
Patented Feb. 8, 1966

3,234,354
PRECISION ELECTRIC MICROWELDER
Mortimer Penberg, Covina, Calif., assignor to Aerojet-General Corporation, Azusa, Calif., a corporation of Ohio
Filed Aug. 1, 1962, Ser. No. 214,051
9 Claims. (Cl. 219—86)

This invention relates to welding, and more particularly to a microwelder for welding tiny components, lead materials and thin film substrates and/or combinations thereof.

Recent developments in space technology have stimulated a need for smaller and lighter circuit subassemblies in order to increase the useful pay load of a vehicle. This need for smaller lighter electronic assemblies has been reflected by the development of smaller and more compact electrical components. Since the smaller and more compact electrical components and mechanisms have to be connected in an electric circuit, a need has arisen for welding apparatus which can reliably weld tiny electrical or mechanical components and lead materials to other electrical or mechanical elements.

More particularly, it would be desirable to provide a welding apparatus which can weld tiny pieces of metal to tiny pieces of insulating material such as glass. In such application as when the metal and insulator are to be part of an electrical component, such as a transistor or thin film circuit, it is not possible to place the work between opposed electrodes, as with conventional welding machines, because one of the surfaces is an insulator. Thermal compression bonding machines are not satisfactory because the heated region of the work is not localized in the weld area and heating the entire component during the welding cycle could destroy it.

What is needed, therefore, and comprises a principal object of this invention is to provide an electrical welding machine which can reliably weld tiny components and lead materials together.

A further object of this invention is to provide a reliable electrical microwelder wherein electrodes are applied to only one side of the work in such a way that the heated region of the work is precisely localized.

The microwelder in its broadest aspect comprises an electrical power supply capable of delivering pulses of electrical energy to a probe-like electrode structure. The electrode structure is formed from separate electrode elements secured together and separated by an insulator to form a unitary rigid structure or probe. This electrode structure is connected to the electrical power supply in such a way that during a welding cycle, current flows down one of the electrode elements through a localized region of the work, then up the other electrode element to complete the circuit. The electrode structure is associated with an appropriate mechanism for moving it in contact with the work. The electrical circuit for the microwelder includes an indicator circuit to indicate when the electrical contact between the electrodes and the work is correct.

Figure 7:
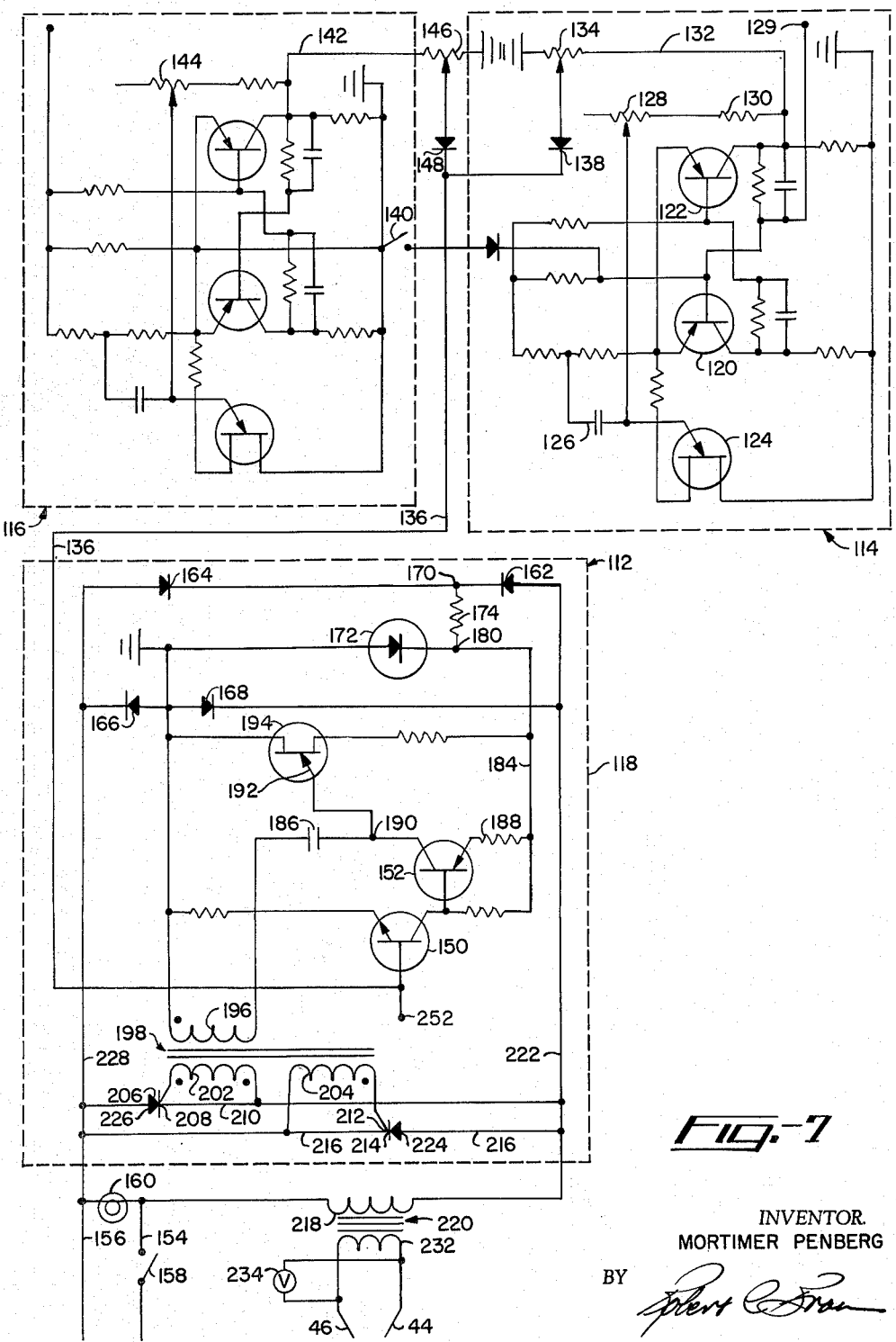
Figure 10:
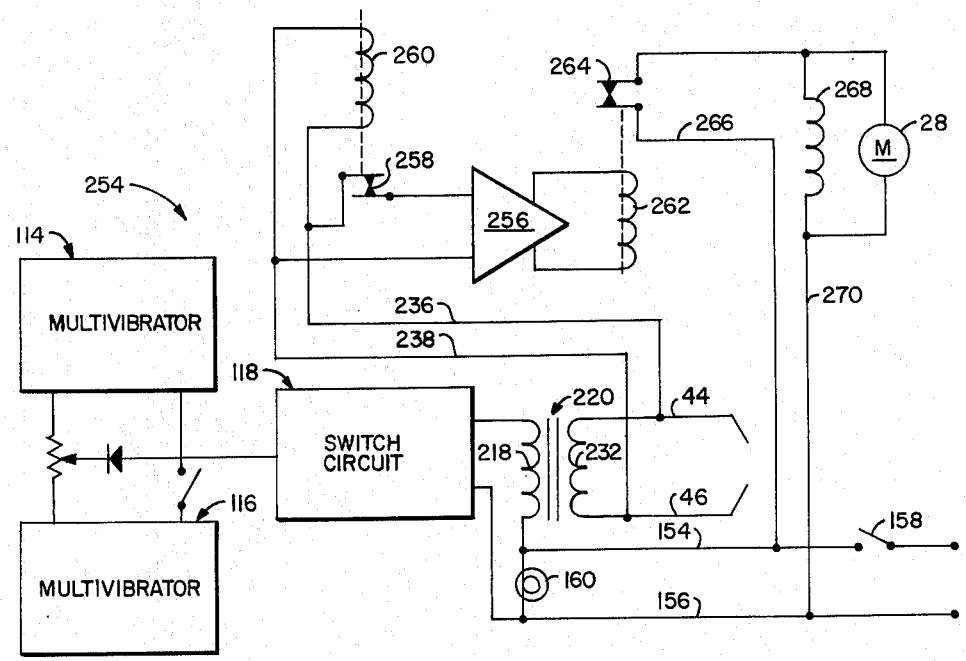
Figure 9:
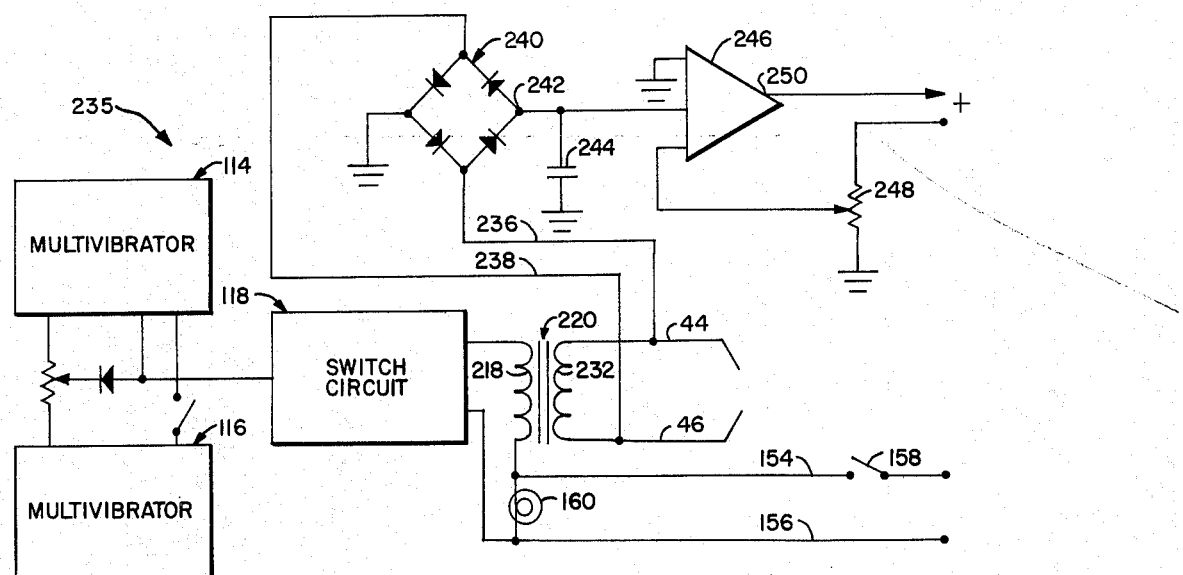

These and other objects of this invention will become more apparent when read in the light of the accompanying drawings and specification, wherein:

FIGURE 1 is a perspective view of the microwelder;
FIGURE 2 is a longitudinal sectional view of one embodiment of the electrode structure for the microwelder;
FIGURE 3 is a transverse sectional view taken on the line 3—3 of FIGURE 2;
FIGURE 4 is an enlarged longitudinal sectional view of the lower portion of the electrode structure shown in FIGURE 2;
FIGURE 5 is a transverse sectional view of a modified concentric electrode structure;
FIGURE 6 is a longitudinal sectional view of another modification of the electrode structure;
FIGURE 7 is a circuit diagram showing the power supply for the microwelder;
FIGURE 8 is a series of diagrams showing the wave forms at various parts of the electrical power supply;
FIGURE 9 is a partially diagrammatic and partially schematic view of a modified power supply control circuit showing a feedback relationship between the electrode structure and the welding pulses delivered by the power supply;
FIGURE 10 is a partly diagrammatic and partly schematic view showing another modified control circuit designed to overcome a poor electrical contact between the electrode structure and the work by increasing the pressure of the electrode structure upon the work surface;
FIGURE 11 is an elevational view of a portion of the electrode structure used with the modification shown in FIGURE 10 and showing a solenoid holding mechanism associated with the electrode structure;
FIGURE 12 is a transverse sectional view taken on the line 12—12 of FIGURE 11; and
FIGURE 13 is a transverse sectional view similar to that shown in FIGURE 12, but with the solenoid holding mechanism de-energized.

Referring now to FIGURE 1 of the drawings, the microwelder, indicated generally by the reference numeral 10 comprises a support housing 12 with a horizontally extending base member 14. Base member 14 is provided with an upstanding portion 16 on which a work supporting member 18 is mounted. The position of the work supporting member 18 on the upstanding portion 16 is controlled by an actuating lever 20 in a manner well-known in the art. A microscope 22 is mounted on the base member 14 for viewing the micro-elements to be welded. In addition, a fixed arm 24 extends horizontally out from the upper end of the support housing 12 over the work supporting member 18 for holding a pair of adjustably mounted lights 26 whereby the work can be properly illuminated.

An electric motor 28 is mounted inside the support housing 12. The drive shaft 29 of the motor is connected to a threaded shaft 30 by means of a toothed belt 32. The threaded shaft 30 is in threaded engagement with a fixed tubular nut 34 whereby rotation of the threaded shaft 30 in one direction causes the threaded shaft 30 to move upward with respect to the tubular nut 34, and rotation of the threaded shaft 30 in the opposite direction causes the threaded shaft 30 to move downward with respect to the tubular nut 34.

An arm 36 is secured to and movable with threaded shaft 30. The arm 36 extends through a vertical slot 38 in the front wall of the housing 12. The free end 40 of the arm 36 is provided with a vertical bore 41 for receiving and holding an electrode structure 42. With this arrangement, operation of the motor 28 in one direction causes the electrode structure 42 to move toward the work supporting member 18, and operation of the motor 28 in the opposite direction causes the electrode structure 42 to move away from the work supporting member 18. Although the example shown in the drawing and described above utilizes an electric motor 28 for control of the electrode structure 42, it is apparent that the electrode structure 42 could be controlled by other mechanisms, such as a hydraulic or pneumatic motor.

The electrode structure 42 has a pencil-like appearance (see FIGURE 2). As shown in FIGURE 3, the electrode structure 42 comprises electrode elements 44 and 46 which are separated from each other by an insulating material 48 and covered by an insulator 50. The electrodes 44 and 46 are semi-circular in cross-section and are bonded to the insulating material 48, so as to cooperate with each other to form a rigid structure.

FIGURE 4 discloses the electrode structure 42 in contact with the work 55, the lower ends or tips 43 of the electrodes 44 and 46 being in engagement with a surface of a conductive member 52 of the work 55 which is to be microwelded to a conductive or nonconductive member 54 of the work 55. The dotted lines passing through the work 55 indicate the path of the current between electrodes 44 and 46. It is noted that the lower ends 43 of the electrodes 44 and 46 as seen in FIGURE 2 appear to be pointed. However, this view is misleading because of the size of the micro-elements to be welded (.005" to .01"). In practice, the lower ends 43 of the electrodes 44 and 46 would have to be flattened as shown in FIGURE 4.

By bonding the electrodes 44 and 46 together, separated only by the insulating material 48, the spacing between the electrodes 44 and 46 is absolutely fixed. This feature is extremely important in microwelding because minute variations in the spacing of the electrodes would have a substantial effect on the heating applied to the work and consequently to the integrity of the weld. With this arrangement, the problem of quality control in microwelding operations is vastly simplified. In contrast, where the electrodes are in spaced relation to each other with an open space therebetween, the problem of quality control in microwelding is extremely difficult. This is because very tiny variations in the spacing of the electrodes, such as might be produced by room vibration or thermal expansion of the mounting structure of the electrodes, could have substantial effects on the quantity of heat delivered to the work. The electrode structure 42 shown in FIGURES 2 and 3 of the drawings utilizes electrodes 44 and 46 which are generally semicylindrical in shape. It is apparent, however, that the electrode structure could have other possible configurations. For example, the electrode structure 56 shown in FIGURE 5 of the drawings is formed from an outer tubular electrode 58 and an inner cylindrical electrode 60 separated from each other by a tubular dielectric 62.

With the electrode structure shown in FIGURE 3 or 5, when the work ocntacting or lower ends 43 of the electrodes of the electrode structure 42 or 56 become worn, they can be reshaped without disturbing the spatial relationship between the electrodes.

The electrode structure 42 is provided with a fixed collar 63 secured thereon by any suitable means. A flanged sleeve or bushing 65 is mounted on the free end 40 of the arm 36 which holds the electrode structure 42 with the flanged upper end 67 of the sleeve 65 adapted to bear against collar 63. The external diameter of the intermediate portion of sleeve 65 snugly fits in a bore 71 provided in the arm 36 with the free end 40 of arm 36 being embraced by the upper and lower flanges 67 and 69 of the sleeve 65.

A cup-shaped member 64 is attached to the upper end of the electrode structure 42 remote from the work contacting portions or tips 43 of the electrodes 44 and 46 (see FIGURE 2). This cup-shaped member 64 is adapted to be filled with pellets 66 or to carry a weight-loaded adapter or a spring-loaded carrier. With this arrangement, as the electrode structure 42 is moved toward the work 55 by motor 28, collar 63 rests on and is supported by the upper flange 67 of sleeve or bushing 65. However, when the work contacting portions or tips 43 of the electrodes 44 and 46 of the electrode structure 42 contact the work 55, continued downward movement of arm 36 causes the sleeve 65 to move downwardly with respect to the electrode structure 42 to a dotted line position shown in FIGURE 2, while at the same time, the sleeve 65 holds the electrode structure 42 in an erect position. As a consequence, the force of contact between the work contacting end portions or tips 43 of the electrodes 44 and 46 and the work 55 will depend only on the weight of the electrode structure 42, as influenced by the number of pellets or weights 66 placed in or on the cup-shaped member 64. This arrangement substantially eliminates variations in the force of contact between the electrode structure 42 and the work 55. It also reduces unpredictable variations in the pressure applied to the work area under the tips 43 of the electrodes 44 and 46 and in the current flow through the work 55; consequently, unpredictable variations in the heat supplied to the work area are reduced. This arm-electrode arrangement provides a useful increase in the level of quality control of the microweld.

An additional modified electrode structure 68 is shown in FIGURE 6 wherein the individual electrodes 70 and 72 are generally wheel-shaped and are secured together with an insulating material 74 between them to form a generally rigid unitary electrode wheel 76. The electrode wheel 76 is rotatably mounted in the tines 78 of a fork-like support member 80. The support member 80 is mounted inside a sleeve bearing 82 for axial movement therein. The sleeve bearing 82 is mounted inside a threaded outer shell 84. The outer shell 84 is provided with an internally mounted travel stop ring or washer 86 through which a reduced upper portion 88 of the fork-like support member 80 extends. This reduced upper portion 88 bears against a spring loaded pressure plate 90.

One end of a coil spring 92 bears against the spring loaded pressure plate 90 and the opposite end bears against a cup-shaped spring retainer 94 movably mounted inside sleeve bearing 82. A second coil spring 96 is also mounted inside the sleeve bearing 82 with the opposite ends of the coil spring 96 bearing against cup-shaped members 98 and 100.

A threaded tube 102 is mounted in the upper end of sleeve bearing 82 and a calibrating screw 104 is threadedly mounted therein. The lower end of the calibrating screw 104 is adapted to engage the cup-shaped member 100 engaging the upper end of the second coil spring 96. A microswitch 106 is secured to the outer surface of the shell member 84 surrounding the sleeve bearing 82. The microswitch 106 is provided with an actuating arm 110 which extends through the sleeve bearing 82 between the cup-shaped members 98 and 94.

With this arrangement, the calibrating screw 104 is rotated until spring 96 is compressed a predetermined amount. Only when an opposing pressure on the electrode wheel 76 exceeds this amount will the force transmitted by the electrode wheel 76 to the coil spring 92 exert enough pressure on the actuating arm 110 to cause it to move upwardly and thereby close the microswitch 106. The microswitch 106 is connected in the power supply circuit of the microwelder in such a manner that the pressure of contact of the electrode wheel 76 with the work must exceed the compression imposed on spring 96 by the calibrating screw 104, in order to displace the actuating arm 110 of the microswitch 106 for closing a relay circuit to permit the electrode microwelder to operate. In this way, the force of contact between electrode wheel 76 and the work can be accurately controlled so that the current flowing through the work between the electrodes 70 and 72 of the electrode wheel 76 will not be adversely affected by a poor contact caused by inadequate electrode structure pressure. It is also apparent that a hydraulic or pneumatic system could be used instead of a spring arrangement to perform the same function.

An electronic power supply circuit indicated generally by the reference numeral 112 is provided for the microwelder (see FIGURE 7). The electronic power supply circuit in this particular embodiment comprises a pair of monostable one-shot multivibrators 114 and 116, connected to an electronic phase controlled switch circuit 118. Referring to the circuit for the multivibrator 114, it is generally conventional in design and includes a pair of transistors 120 and 122 along with a unijunction transistor 124. In addition, a timing circuit comprising a capacitor 126, a variable resistor 128, and a resistor 130 is associated with the unijunction transistor 124 for controlling the pulse period of the multivibrator 114. Transistor 120 is biased so it is normally on, or conductive, while transistor 122 is biased so it is normally off, or nonconductive. When a voltage pulse from any source is applied to input terminal 129, the rise in potential of the base of transistor 120 causes it to become nonconductive. This decreases the potential of the base of transistor 122 causing it to become conductive. This occurrence causes the voltage on wire 132 which is connected to the collector of transistor 122 to abruptly increase. While this is happening, the timing circuit comprising capacitor 126 and resistors 128 and 130 causes the potential of the base of unijunction transistor 124 to gradually drop until it abruptly becomes nonconductive. This occurrence causes the monostable multivibrator 114 to revert to its initial condition wherein transistor 120 becomes conductive again while transistor 122 becomes nonconductive. The above described circuit is generally conventional in design and is described on page 145, FIGURE 13.17 in the book, General Electric Transistor Manual, 5th edition, published by the General Electric Company. The operation of the monostable multivibrator 114 causes a square wave to appear on lead wire 132. The duration or period of the square wave may be controlled by the adjustment of variable resistor 128, while the amplitude of the square wave may be controlled by adjustment of variable resistor 134 in lead wire 132. Lead wire 132 is connected to the input lead 136 in the electronic switch circuit 118 through a rectifier 138.

The one-shot monostable multivibrator 116 is identical in design and operation to multivibrator 114 and is designed so that when switch 140 is closed, the return of multivibrator 114 to its stable condition triggers a pulse which causes monostable multivibrator 116 to generate a square wave pulse on lead wire 142. The duration of the square wave pulse on lead wire 142 is controlled by variable resistor 144, while the amplitude of this square wave pulse is controlled by a variable resistor 146 in lead 142. Lead wire 142 is connected to input lead 136 of the electronic switch circuit 118 through a rectifier 148. For reasons to become apparent below, monostable multivibrator 116 is designed to provide a square wave pulse whose amplitude is substantially less than the amplitude of the square wave pulse put out by monostable multivibrator 114.

As shown in FIGURE 7 of the drawings, input lead 136 is connected to the base of input transistor 150 in switch circuit 118. The collector of transistor 150 is connected to the base of amplifier transistor 152. Both transistors 150 and 152 are biased so they are conductive when any square wave pulse from multivibrators 114 or 116 appears on input lead wire 136.

The phase controlled switch circuit 118 is powered by a standard 115 volt A.-C. source connected to input power leads 154 and 156 in which a conventional control switch 158 is mounted. An indicator lamp 160 is placed across the power leads 154 and 156 to indicate that the power is on when it is lighted.

The A.-C. phase-controlled switch circuit 118 includes diodes 162, 164, 166, and 168 which are connected together in a bridge circuit to form a full-wave rectifier. The output of the rectifier appears at terminal 170. Terminal 170 is connected to one end of a Zener diode 172 through a voltage dropping resistor 174. With this arrangement, the sinusoidal input voltage 176, indicated by wave form 8a in FIGURE 8 is both rectified and modified by the co-action between the silicon-controlled rectifiers to be described below, and which function as a short for the bridge circuit, and the full-wave bridge rectifier. Consequently, the actual bridge output voltage 178 appearing at terminal 170 has a wave form 8b, shown in FIGURE 8. The clipping effect of Zener diode 172 modifies the bridge output voltage 8b so that the voltage 182 appearing on terminal 180 has a wave form 8c of FIGURE 8.

This clipped voltage 182 appearing on the common lead wire 184 in cooperation with the amplitude of the square wave pulse delivered by one of the multivibrators 114 or 116, charges a capacitor 186 while transistor 152 is conducting. The time constant for charging capacitor 186 is dependent on the magnitude of its capacitance, the magnitude of resistor 188, and the magnitude of the amplitude of the square wave output from one of the multivibrators 114, 116.

Terminal 190, connected to one side of capacitor 186, is connected to emitter 192 of unijunction transistor 194. The voltage 195 across capacitor 186 has a wave form as shown in 8d of FIGURE 8. When this voltage rises to the correct predetermined level, transistor 194 becomes conductive, thereby permitting capacitor 186 to discharge through the primary coil 196 of a pulse transformer 198; this condition causes an abrupt drop in the potential across capacitor 186. The voltage pulse 200 caused by the discharge of capacitor 186 through the unijunction transistor 194 and through primary coil 196 of the pulse transformer 198 is shown as wave form 8e in FIGURE 8.

Pulse transformer 198 is provided with two secondary coils 202 and 204. The opposite terminals of the secondary coil 202 are connected to the gate terminal of cathode 208 of the silicon controlled rectifier 206 and to circuit lead 210. Similarly the opposite terminals of the secondary coil 204 are connected to the gate terminal of cathode 212 of silicon controlled rectifier 214 and to lead 216. Power lead 154 is connected to one side of leads 210 and 216 through the primary coil 218 of the welding transformer 220 and power lead 156 is connected to the opposite side of leads 210 and 216.

If neither of the silicon controlled rectifiers 206 or 214 are turned on, welding power from the sinusoidal 115V power supply cannot flow through the primary coil 218 of the weld transformer 220 because both of the silicon controlled rectifiers 206, 214 act as open circuits. However, if the polarity between the cathode and anode of either of the silicon controlled rectifiers 206, 214 has a proper relationship at a time when a pulse is applied to the gate of the cathode of the silicon controlled rectifier, then it becomes and remains conductive until the voltage between the cathode and anode of the silicon controlled rectifier becomes zero in the course of its alternation. In particular, if the voltage from lead 154 is momentarily positive on lead wire 222, the potential of anode 224 of silicon controlled rectifier 214 will be positive with respect to the cathode 212. Hence, if a pulse 200 is applied to the gate of silicon controlled rectifier 214 at the latter time, it will become conductive and a power pulse will flow through the primary coil 218 of the weld transformer 220 through lead 216 and back to the opposite power lead 156 to complete the circuit. However, the same positive voltage appearing on lead 222 and in lead 210 would make the cathode 208 of silicon controlled rectifier 206 positive with respect to the anode 226. As a consequence, the same voltage pulse 200 from the pulse transformer 198 would be ineffective in turning silicon controlled rectifier 206 on and silicon controlled rectifier 206 would still appear as an open circuit in lead 210.

When the potential on lead wire 222 alternates and becomes negative instead of positive, silicon controlled rectifier 214 turns off as the potential between its cathode 212 and anode 224 becomes zero and the potential of anode 224 of silicon controlled rectifier 214 will become negative with respect to the cathode 212. As a result, a gate pulse 200 from pulse transformer 198 would be ineffective in turning the silicon controlled rectifier 214 on under these conditions. However, when the potential on lead 222 becomes negative, the potential on lead 228 becomes positive. Hence, the anode 226 of silicon controlled rectifier 206 becomes positive with respect to the cathode 208. As a result, when gate pulse 200 from pulse transformer 198 is applied to silicon controlled rectifier 206 under these conditions, it becomes conductive and a circuit is completed between leads 222 and 228 through lead 210. Consequently, a power pulse can flow through the weld transformer's primary coil 218 of weld transformer 220.

In summary to this point, it is clear that no power pulse can flow through primary coil 218 of weld transformer 220 unless one of the silicon controlled rectifiers 206 or 214 is conductive. It is apparent, therefore, that by controlling the time from the beginning of the A.-C. cycle, when a gate pulse appears at primary coil 196 of pulse transformer 198, the shape of the power pulse passing through the weld transformer coil 218 can be controlled.

Referring now to wave form 8f in FIGURE 8, the dotted portion of sinusoidal wave form 230 indicates portions of a sinusoidal pulse supplied by the power input leads 154 and 156 when the silicon controlled rectifiers 206 and 214 are nonconductive. However, by referring to the wave form 8e in FIGURE 8, it is apparent that as soon as a tiny pulse 200 appears at primary coil 196 of pulse transformer 198, one of the silicon controlled rectifiers 206 or 214 becomes conductive, permitting the remaining portion of the voltage cycle to pass through primary coil 218 of the weld transformer 220.

As stated above, the silicon controlled rectifiers 206 and 214 turn off each time the voltage between their cathodes and anodes passes through zero. Hence, the energy in each voltage pulse 230 delivered to the primary coil 218 of the weld transformer 230 can be adjusted as desired by varying the size of capacitor 186, or the size of resistor 188, or the amplitude of the square wave pulse from the multivibrator 114 which together determine the period of time it takes to cause unijunction transistor 194 to break down and deliver a voltage pulse 200 to primary coil 196 of pulse transformer 198.

Multivibrator 114 is set so the period of its squarewave voltage pulse is large in comparison to the period of a 115-volt A.-C. power supply provided to input leads 154 and 156. As a consequence, the A.-C. switch circuit 118 will remain in operation only so long as a positive pulse appears on input lead 136. During this time, a train of voltage pulses each containing a precise and controlled quantity of energy will pass through primary coil 218 of weld transformer 220 each time multivibrator 114 provides a square wave pulse. By controlling the period of the square wave pulse, it is apparent that the number of pulses passing through the weld transformer 220 can be accurately controlled.

If switch 140 is closed, then after the multivibrator 114 completes its square wave pulse, the reversion of multivibrator 114 to its stable condition triggers a second square wave pulse in multivibrator 116. The amplitude of this square wave pulse described above is smaller than the amplitude of a square wave pulse from multivibrator 114. This will affect the charging time of the capacitor 186 in the switch circuit 118, so that a plurality of pulses containing a smaller quantity of energy will pass through primary coil 218 of weld transformer 220. This automatically supplies the work with a decreased quantity of heat in order to gradually cool the work and eliminate undesired thermal stresses which could be caused by abrupt cooling.

In resistance welding techniques, the heat generated in the work depends on the magnitude of the current flowing therethrough. This in turn depends on the resistance between the electrodes contacting the work. If the resistance between the electrodes and the work varies, the current flow and the heat applied to the work will likewise vary. Since the resistance between the electrodes and the work can vary because of insufficient pressure, or because of the presence of foreign matter, the energy in the welding pulses actually flowing through the work can become unpredictable, thereby affecting the quality control of the microwelds. To prevent this from happening, it is desirable to provide means for indicating when the contact between the electrodes and the work is proper, or when for some reason, the contact between the electrodes and the work is so poor that substantial and undesired resistances are introduced in the circuit.

As shown in FIGURE 7, the opposite terminals of the secondary coil 232 of the weld transformer 220 are each connected to one of the electrodes 44 and 46. Even if no welding pulse is passing through the primary coil 218 of the weld transformer 220, a small current will pass therethrough due to the action of the bridge rectifier defined by diodes 162, 164, 166, and 168 supplying a small quantity of current to the Zener diode 172. If a suitable voltmeter 234 is connected between these electrodes 44 and 46 as shown, then an increase in the potential between the electrodes 44 and 46 caused by an improper contact with the work 55 could be detected. Hence, the voltmeter 234 provides an indication of whether the electrodes 44 and 46 are in proper contact with the work 55.

The extent to which the reading on voltmeter 234 departs from the voltage between electrodes 44 and 46 which corresponds to a good contact with the work 55, can provide a means for controlling the power supply so that the amplitude and number of the power pulses delivered to primary coil 218 of weld transformer 220 will increase automatically to compensate for the poor contact between the electrodes 44 and 46 and the work 55. This requires a feedback circuit arrangement such as disclosed in FIGURE 9.

In the modified power supply circuit indicated generally by the reference numeral 235 shown in FIGURE 9, leads 236 and 238 connected to the terminals of the secondary coil 232 of the weld transformer 220 are connected between electrodes 44 and 46 to the opposite side of a diode-type bridge rectifier indicated generally by reference numeral 240. The negative pulsating voltage output from the bridge rectifier 240 appears on terminal 242. This pulsating voltage output is smoothed by a sufficiently large capacitor 244 and is fed into one side of a differential amplifier 246. The opposite side of the differential amplifier 246 is connected to the slide contact of a grounded variable resistor 248. A supply voltage is connected to the side of the variable resistor 248 opposite the grounded end. The output voltage of the differential amplifier 246 appearing on terminal 250 represents a voltage which is proportional to the difference between the correct voltage between electrodes 44 and 46 which would occur when these electrodes are making a good contact with the work 55, and the actual voltage which does occur. Terminal 250 is connected to the switch circuit 118 at input terminal 252 (see FIGURE 7).

By this arrangement, the negative differential voltage applied to the input terminal 252 increases the time constant for charging capacitor 186, thereby decreasing the energy supplied by the weld transformer 220. Consequently, the decreased energy in the power pulses passing through the primary coil 218 during a welding operation compensates the electrode structure 42 automatically for the increased resistance between the electrodes 44 and 46 and the work 55. In this way, the quality control and the reliability of the welds formed by the microwelding apparatus is maintained.

Another method of compensating for a poor contact between the electrode structure 42 and the work 55 is by increasing the pressure which the electrode structure 42 exerts against the work 55. The modified control circuit indicated generally by the reference numeral 254 and shown in FIGURE 10 of the drawings, accomplishes this by connecting leads 236 and 238 leading from electrodes 44 and 46 to an amplifier 256. Lead 236 from electrode 44 passes through normally closed contacts 258 of a relay 260. The terminals of the coil of relay 260 are connected across leads 236 and 238 respectively. The relay coil 260 is designed so that when a power pulse passes through primary coil 218 of weld transformer 220, the voltage across leads 236 and 238 will be sufficient to cause the relay 260 to open the contacts 258 so that the motor 28 will not operate.

The output of amplifier 256 is connected across the terminals of the coil of a relay 262. The relay 262 is associated with a pair of normally open contacts 264 and when the input voltage to amplifier 256 is sufficiently large, the power delivered to relay 262 causes contacts 264 to close. Power lead 266 connected to power input lead 154 is connected to one side of the normally open contacts 264. The opposite side of the contacts 264 is connected to one side of a holding solenoid coil 268 and to motor 28. The opposite ends of the holding solenoid 268 and the motor 28 are connected through a lead 270 to the power input lead 156.

With this arrangement, when switch 158 is closed, and when the electrodes 44 and 46 are not in contact with the work 55, the voltage between electrodes 44 and 46 caused by current flowing through the primary coil 218 of the weld transformer 220 in the switch circuit 118 will be at a maximum for conditions when no weld pulse is being delivered to the primary coil 218. This voltage is sufficient when amplified by amplifier 256 to cause relay 262 to close contacts 264. This causes motor 28 to begin operation and move the electrodes 44 and 46 into contact with the work 55. As the electrodes 44 and 46 contact the work 55, the resistance between the electrodes 44 and 46 and the work 55 will decrease as the force of contact increases until the electrodes 44 and 46 make a good contact with the work 55, whereby the voltage between electrodes 44 and 46 drops to a minimum. This causes relay 262 to open contacts 264, thereby cutting off power to motor 28 and releasing electrodes 44 and 46 held by the holding solenoid 268.

In this particular embodiment, the holding solenoid 268 is mounted on the arm 36 seen in FIGURE 11 of the drawings. Arm 36 is, in this particular embodiment, provided with an integrally formed semi-circular clamp member 272 (see FIGURES 12 and 13). An opposed semi-circular clamp member 274 is associated with semi-circular clamp member 272 and is attached thereto and separated therefrom by compressed coil springs 276. Both of the semi-circular clamp members 272 and 274 are formed from a magnetic material, and when the holding solenoid 268 is actuated, the clamp members 272 and 274 are magnetized and drawn together, as shown in FIGURE 12. This causes the clamp members 272 and 274 to tightly embrace the electrode structure 42 so that as the arm 36 moves vertically with respect to the work 55, the electrode structure 42 is carried with it.

When power to the holding solenoid 268 is cut off, the compression in springs 276 forces the semi-circular clamp members 272, 274 to separate sufficiently so that the electrode structure 42 is freely movable therein. With this arrangement, until electrode structure 42 makes a good contact with the work 55, motor 28 remains on, continually increasing the force of engagement between the electrode structure 42 and the work 55. However, after a good electrical contact with the work 55 is obtained, solenoid 268 is deenergized and the sole pressure exerted by the electrode structure 42 against the work 55 is caused by the weight of the electrode structure 42 alone. Consequently, the initial pressure between the electrode structure 42 and the work 55 is the same for each welding operation. As a result, the problem of quality control in microwelding is simplified.

It is to be understood that the forms of the invention herewith shown and described are to be taken as preferred examples of the same, and that various changes in the shape, size and arrangement of the parts may be resorted to without departing from the spirit of this invention or the scope of the claims.

I claim:
1. A microwelder of the class described comprising a support, a rod-like electrode structure, a motor associated with said support and said electrode structure whereby operation of said motor causes said electrode structure to engage or disengage the work; said electrode structure being at least bilaterally symmetrical and comprising at least two electrodes separated by a relatively thin layer of insulating material and bonded together in a fixed spaced relationship to form a unitary structure, the work contacting portions of said electrodes and the relatively thin layer of insulating material defining an operative end portion for the electrode structure having the appearance of the writing tip of a pencil whereby the electrode structure following wear of the work contacting portions of the electrodes can be reshaped like a pencil; said electrode structure being sufficiently rigid so that the work contacting portions of the electrodes can be formed small enough to precisely localize the energy applied to the work without causing appreciable deformation due to the force of engagement between the electrode structure and the work, an electric power supply, the electrodes forming said electrode structure being connected to said power supply in such a way that during delivery of welding power while the electrode structure is engaging one electrically conductive side of the work, current flows from the power supply down one electrode through the work and back up the other electrode to complete the circuit, and means for precisely regulating the force of engagement between the electrode structure and the work to regulate and standardize the electrical resistance between the electrode structure and the work.

2. A microwelder of the class described comprising a support, a rod-like electrode structure, motor means mounted on said support, a shaft connected to said motor means in such a way that operation of said motor means causes said shaft to rotate, an arm slidably mounted on said shaft and connected thereto in such a way that rotation of said shaft causes said arm to move axially with respect to said shaft, said electrode structure being mounted on said arm whereby operation of said motor means in one direction causes said shaft to rotate so that the arm and the electrode structure carried by the arm move into engagement with the work, while operation of the motor means in the opposite direction causes said arm and said electrode structure to move away from the work; said electrode structure being at least bilaterally symmetrical and comprising at least two electrodes separated by a relatively thin layer of insulating material and bonded together in a fixed spaced relationship to form a unitary structure, the work contacting portions of said electrodes and the relatively thin layer of insulating material defining an operative end portion for the electrode structure having the appearance of the writing tip of a pencil whereby the electrode structure following wear of the work contacting portions of the electrodes can be reshaped like a pencil; said electrode structure being sufficiently rigid so that the work contacting portions of the electrodes can be formed small enough to precisely localize the energy applied to the work without causing appreciable deformation due to the force of engagement between the electrode structure and the work, an electric power supply, the electrodes forming said electrode structure being connected to said power supply in such a way that during delivery of welding power while the electrode structure is engaging one electrically conductive side of the work, current flows from the power supply down one electrode through the work and back up the other electrode to complete the circuit, and means for precisely regulating the force of engagement between the electrode structure and the work to standardize the resistance between the electrode structure and the work each time the electrode structure moves into engagement with the work.

3. The microwelder described in claim 2 wherein the electrode structure is freely slidably mounted inside of a sleeve, said sleeve being provided with an upper radially outwardly extending flange, said arm embracing said sleeve, a collar rigidly secured to the electrode structure, said upper flange bearing against said collar whereby until the electrode structure engages the work, the electrode structure is held in a fixed position with respect to said arm with the upper flange of said sleeve bearing against the collar, and when the electrode structure engages the work, continued downward movement of the arm carries the sleeve away from the collar so that the force of engagement between the electrode structure and the work is due solely to the weight of the electrode structure.

4. The microwelder described in claim 2 wherein said arm is in fixed relation to a holding member, a solenoid mounted on said arm for actuating said holding member and causing said arm to hold the electrode structure in a fixed position with respect thereto when the solenoid is energized and for releasably guiding said electrode structure when the solenoid is not energized, whereby when the electrode structure engages the work and energy to the solenoid is removed, the force of engagement between the electrode structure and the work is governed solely by said force regulating means.

5. In a microwelder, a rod-like electrode structure, said electrode structure being at least bilaterally symmetrical and comprising at least two electrodes separated by a relatively thin layer of insulating material and bonded together to form a rigid unitary structure, the work contacting portions of said electrodes and the relatively thin layer of insulating material defining an operative end portion for the electrode structure having the appearance of the writing tip of a pencil whereby the electrode structure following wear of the work contacting portions of the electrodes can be reshaped like a pencil, a cup-like member integrally attached to the upper end of the electrode structure, and said cup-like member being adapted to receive particles of material whereby the weight of the electrode structure can be altered as desired.

6. A microwelder of the class described comprising a support, a rod-like electrode structure, actuating means associated with said support and said electrode structure whereby operation of said actuating means selectively causes said electrode structure to engage or disengage the work; said electrode structure being at least bilaterally symmetrical and comprising at least two electrodes separated by a relatively thin layer of insulating material and bonded together to form a unitary structure, the work contacting portions of said electrodes and the relatively thin layer of insulating material defining an operative end portion for the electrode structure having the appearance of the writing tip of a pencil whereby the electrode structure following wear of the work contacting portions of the electrodes can be reshaped like a pencil; said electrode structure being sufficiently rigid so that the work contacting portions of the electrodes can be formed small enough to precisely localize the application of energy to the work without causing appreciable deformation due to the force of engagement between the electrode structure and the work, an electric power supply, the electrodes forming said electrode structure being connected to said power supply in such a way that during delivery of welding power while the electrode structure is engaging one electrically conductive side of the work, current flows from the power supply down one electrode through the work and back up the other electrode to complete the circuit, and means associated with said electrode structure for indicating when the electrical contact between the electrode structure and the work is correct.

7. A microwelder of the class described comprising a support, a rod-like electrode structure, actuating means associated with said support and said electrode structure whereby operation of said actuating means selectively causes said electrode structure to engage or disengage the work; said electrode structure being at least bilaterally symmetrical and comprising at least two electrodes separated by a relatively thin layer of insulating material and bonded together to form a unitary structure, the work contacting portions of said electrodes and the relatively thin layer of insulating material defining an operative end portion for the electrode structure having the appearance of the writing tip of a pencil whereby the electrode structure following wear of the work contacting portions of the electrodes can be reshaped like a pencil; said electrode structure being sufficiently rigid so that the work contacting portions of the electrodes can be formed small enough to precisely localize the energy applied to the work without causing appreciable deformation due to the force of engagement between the electrode structure and the work, an electric power supply, the electrodes forming said electrode structure being connected to said power supply in such a way that during delivery of welding power, while the electrode structure is engaging one electrically conductive side of the work, current flows from the power supply down one electrode through the work and back up the other electrode to complete the circuit; and means connected between said electrode structure, said power supply, and said support for automatically increasing the force of engagement between the electrode structure and the work to compensate for a poor electrical contact between the electrode structure and the work until a good electrical contact is obtained and then releasing said electrode structure so that the force of engagement between the electrode structure and the work depends only on the weight of the electrode structure during each welding operation.

8. A microwelder of the class described comprising a support, a rod-like electrode structure, actuating means associated with said support and said electrode structure whereby operation of said actuating means selectively causes said electrode structure to engage or disengage the work; said electrode structure being at least bilaterally symmetrical and comprising at least two electrodes disposed in spaced apart relationship, and a relatively thin layer of insulating material disposed between adjacent electrodes and respectively bonded thereto to form a unitary structure with said electrodes in a fixed spaced relation with respect to each other, the work contacting portions of said electrodes being flush with the exposed end of said relatively thin layer of insulating material therebetween and defining therewith an operative end portion for the electrode structure having the appearance of the writing tip of a pencil whereby the electrode structure following wear of the work contacting portions of the electrodes can be reshaped like a pencil; said electrode structure being sufficiently rigid so that the work contacting portions of the electrodes can be formed small enough to precisely localize energy applied to the work without causing appreciable deformation due to the force of engagement between the electrode structure and the work, an electric power supply, and the electrodes forming said electrode structure being connected to said power supply in such a way that during delivery of welding power, while the electrode structure is engaging one electrically conductive side of the work, current flows from the power supply down one electrode through the work and back up the other electrode to complete the circuit.

9. In a microwelder, a rod-like electrode structure, said electrode structure being at least bilaterally symmetrical and comprising at least two electrodes, and a relatively thin layer of insulating material separating adjacent electrodes and bonding said electrodes together in a fixed spaced relationship to form a unitary structure, and the work contacting portions of said electrodes and the relatively thin layer of insulating material defining an operative end portion for the electrode structure having the appearance of the writing tip of a pencil whereby the electrode structure following wear of the work contacting portions of the electrodes can be reshaped like a pencil.

References Cited by the Examiner

UNITED STATES PATENTS

| | | | |
|---|---|---|---|
| 1,862,653 | 6/1932 | Bean | 219—234 |
| 1,910,882 | 5/1933 | Caputo | 219—84 |
| 1,995,494 | 3/1935 | Bardet et al. | 219—85 |
| 2,071,418 | 2/1937 | McBerty | 219—82 |
| 2,180,396 | 11/1939 | Burke | 219—119 |
| 2,429,039 | 10/1947 | Warner | 219—85 X |
| 2,750,484 | 6/1956 | Ewald | 219—86 |
| 2,795,688 | 6/1957 | McCaffrey | 219—119 |
| 3,050,617 | 8/1962 | Lasch et al. | 219—85 |
| 3,060,306 | 10/1962 | Inoue | 219—110 |
| 3,068,350 | 12/1962 | Archer | 219—110 |
| 3,089,020 | 5/1963 | Hurlebaus | 219—86 |

References Cited by the Applicant

FOREIGN PATENTS 75,745  6/1961  France.

RICHARD M. WOOD, *Primary Examiner.*